(12) United States Patent
Kuroda et al.

(10) Patent No.: US 12,491,878 B2
(45) Date of Patent: Dec. 9, 2025

(54) BRAKE LIGHT ACTIVATION DETERMINING DEVICE, STORAGE MEDIUM STORING COMPUTER PROGRAM FOR DETERMINING BRAKE LIGHT ACTIVATION, AND METHOD FOR DETERMINING BRAKE LIGHT ACTIVATION

(71) Applicant: TOYOTA JIDOSHA KABUSHIKI KAISHA, Toyota (JP)

(72) Inventors: Ryusuke Kuroda, Tokyo-to (JP); Hitoshi Kamada, Kawasaki (JP); Tetsuro Sugiura, Chofu (JP); Daisuke Hashimoto, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 18/355,032

(22) Filed: Jul. 19, 2023

(65) Prior Publication Data
US 2024/0067171 A1 Feb. 29, 2024

(30) Foreign Application Priority Data
Aug. 25, 2022 (JP) .................................. 2022-134102

(51) Int. Cl.
*B60W 30/095* (2012.01)
*G06V 20/58* (2022.01)

(52) U.S. Cl.
CPC ....... *B60W 30/0956* (2013.01); *G06V 20/584* (2022.01); *B60W 2554/402* (2020.02);
(Continued)

(58) Field of Classification Search
CPC .......... B60W 30/095; B60W 30/0956; B60W 30/143; B60W 30/16; B60W 30/165;
(Continued)

(56) References Cited

U.S. PATENT DOCUMENTS 9,260,095 B2 * 2/2016 Chundrlik, Jr. ........... B60T 7/22
2018/0137380 A1 * 5/2018 Alrefai ..................... B60T 7/22
(Continued)

FOREIGN PATENT DOCUMENTS

JP 11-39597 A 2/1999
JP 2005-202516 A 7/2005
(Continued)

*Primary Examiner* — Brandon Z Willis
(74) *Attorney, Agent, or Firm* — Sughrue Mion, PLLC

(57) ABSTRACT

A brake light activation determining device has a processor configured to detect decrease in the speed of a vehicle ahead, which is located ahead of one's own vehicle, based on output information from a sensor that acquires information relating to the vehicle ahead, to discriminate whether the brake light of the vehicle ahead is activated based on an image representing the vehicle ahead, and to determine that the vehicle ahead is braking, when it has been discriminated that the brake light of the vehicle ahead has been activated, when the speed decrease timing at which reduction in the speed of the vehicle ahead has been detected and the activation timing at which brake light activation by the vehicle ahead was discriminated are synchronized for the vehicle ahead.

6 Claims, 4 Drawing Sheets

(52) U.S. Cl.
CPC .............. *B60W 2554/4042* (2020.02); *B60W 2554/4045* (2020.02)

(58) Field of Classification Search
CPC ........... B60W 30/17; B60W 30/18018; B60W 40/04; B60W 40/107; B60W 2554/40; B60W 2554/4042; B60W 2554/804; B60W 2554/402; B60W 2554/4045; G06V 20/58; G06V 20/584; G08G 1/166; G05D 1/622; G05D 1/633
See application file for complete search history.

(56) References Cited

U.S. PATENT DOCUMENTS

| | | | |
|---|---|---|---|
| 2021/0300367 A1* | 9/2021 | Yamashita | G06V 20/584 |
| 2021/0331691 A1* | 10/2021 | Ham | B60W 30/09 |
| 2021/0370829 A1* | 12/2021 | Lee | B60K 35/29 |

FOREIGN PATENT DOCUMENTS

| | | |
|---|---|---|
| JP | 2017-174204 A | 9/2017 |
| JP | 2018-52406 A | 4/2018 |

* cited by examiner

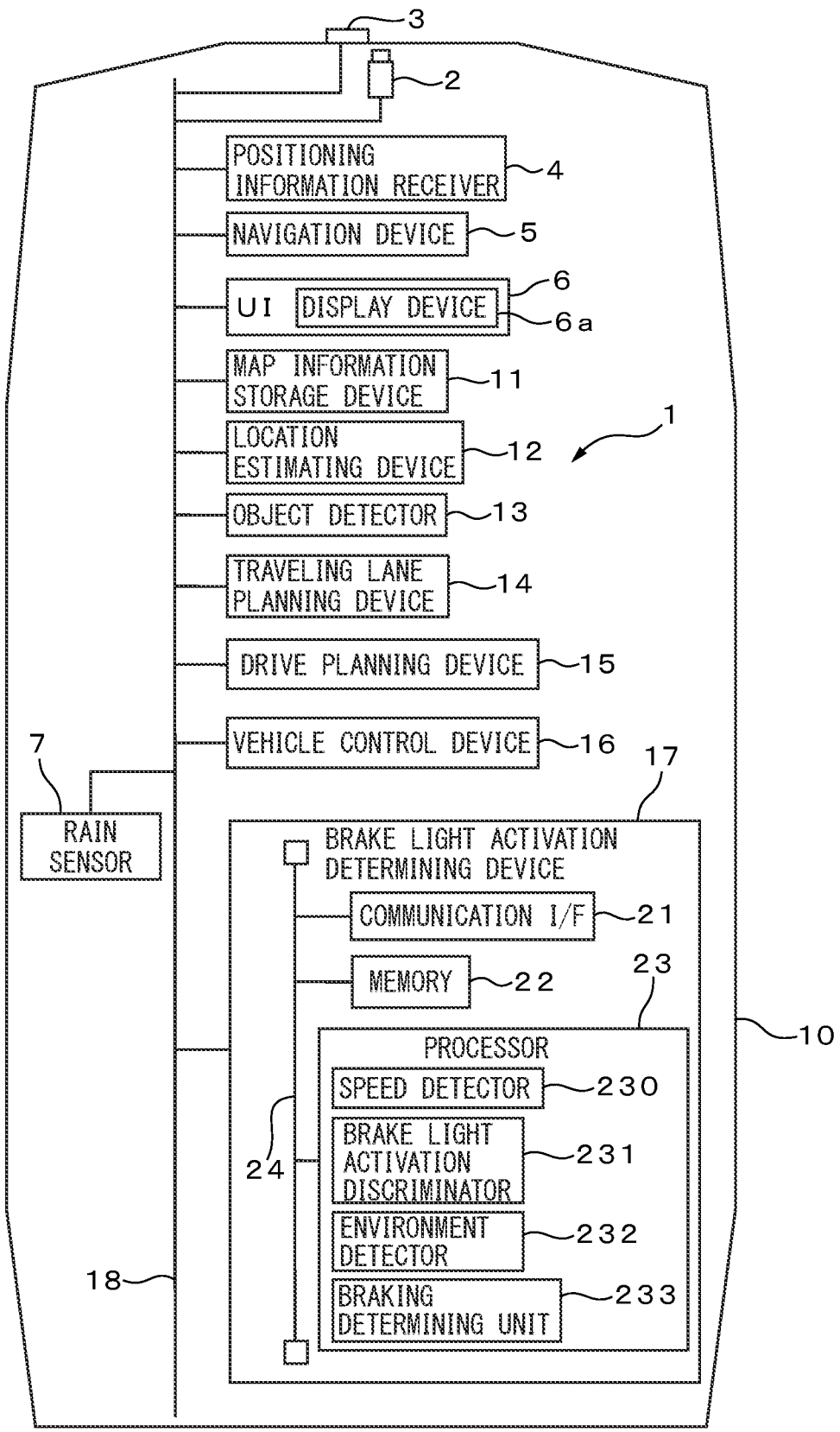

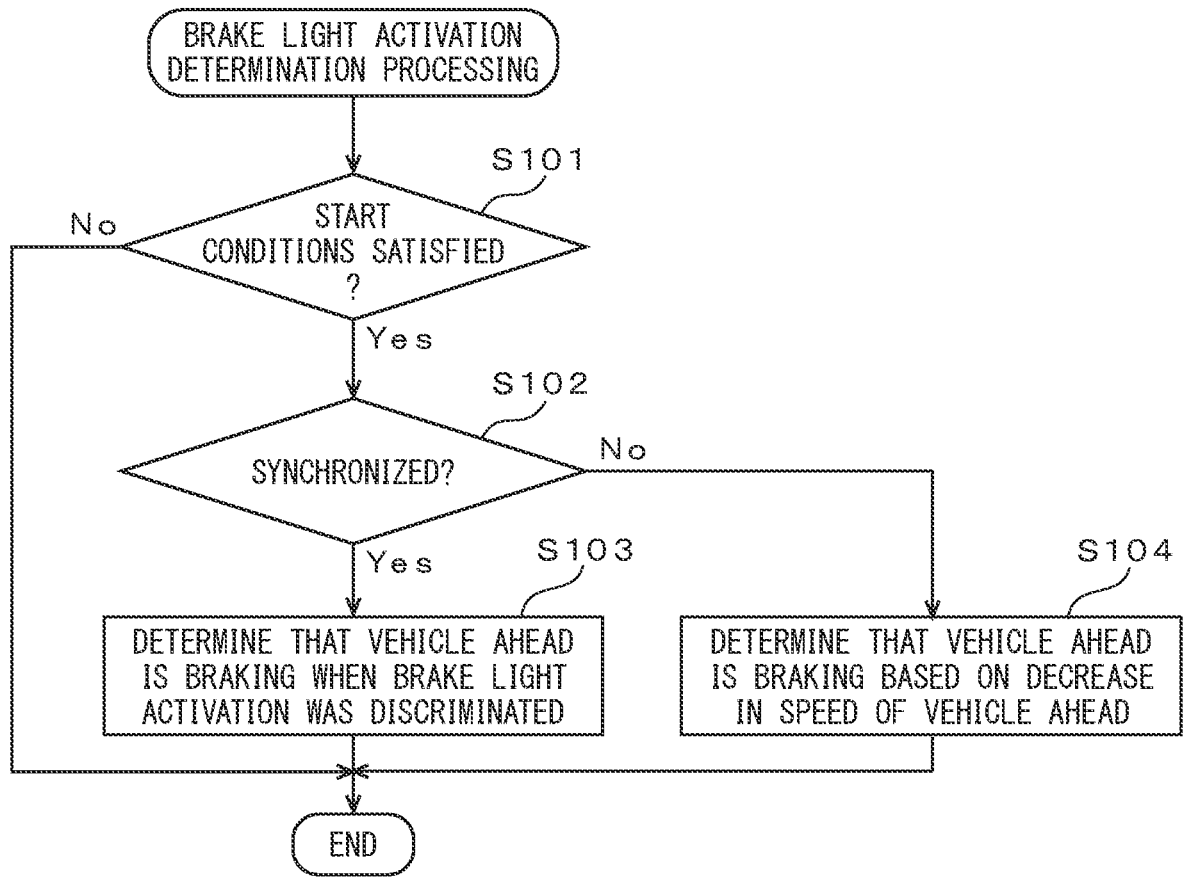

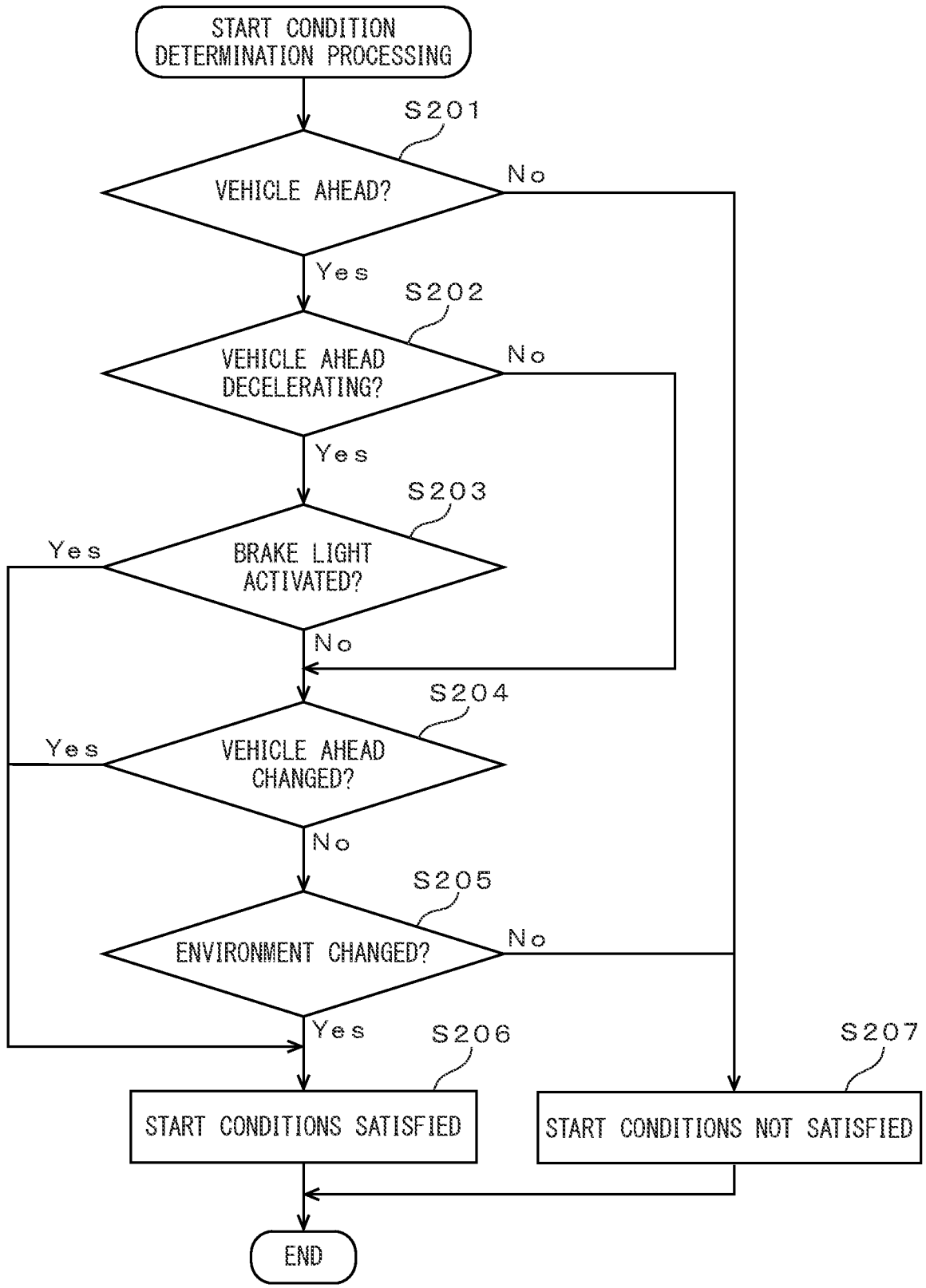

BRAKE LIGHT ACTIVATION DETERMINING DEVICE, STORAGE MEDIUM STORING COMPUTER PROGRAM FOR DETERMINING BRAKE LIGHT ACTIVATION, AND METHOD FOR DETERMINING BRAKE LIGHT ACTIVATION

FIELD

The present disclosure relates to a brake light activation determining device, a storage medium storing a computer program for determining brake light activation, and a method for determining brake light activation.

BACKGROUND

An automatic control system mounted in a vehicle creates a traveling route for the vehicle based on the current location of the vehicle, the destination location of the vehicle, and map information, and controls the vehicle so that it travels along the traveling route.

The automatic control system controls the vehicle so that at least a predetermined distance is maintained between one's own vehicle and other vehicles in its vicinity. The automatic control system therefore rapidly detects deceleration of a vehicle traveling ahead of one's own vehicle, so as to ensure a space of at least a predetermined distance even when the vehicle ahead has decelerated.

Deceleration of the vehicle ahead can be detected using a sensor such as a LiDAR sensor or radar sensor. Deceleration of the vehicle ahead can also be detected by discriminating activation of the brake lights of the vehicle ahead from an image taken of the area ahead of the vehicle (see Japanese Unexamined Patent Publication No. 2017-174204, for example).

Discriminating brake light activation in the vehicle ahead from an image can be carried out in a shorter time than detecting deceleration of the vehicle ahead using a sensor such as a LiDAR sensor or radar sensor.

SUMMARY

However, in some cases it may be erroneously determined that the brake lights of the vehicle ahead are activated when they are not activated, due to reflection of light such as sunlight. The precision for discerning brake light activation of a vehicle ahead based on an image has therefore been less than adequate.

It is an object of the present disclosure to provide a brake light activation determining device that can detect activation of the brake light of a vehicle ahead in a short time and make determination with high precision.

(1) According to one embodiment, the invention provides a brake light activation determining device. The brake light activation determining device has a processor configured to detect a decrease in the speed of a vehicle ahead which is located ahead of one's own vehicle, based on output information from a sensor that acquires information relating to the vehicle ahead, discriminate whether the brake light of the vehicle ahead is activated based on an image representing the area ahead of the one's own vehicle, and determine that the vehicle ahead is braking, when it has been discriminated that the brake light of the vehicle ahead has been activated, when the speed decrease timing at which reduction in the speed of the vehicle ahead has been detected and the activation timing at which brake light activation by the vehicle ahead was discriminated are synchronized for the vehicle ahead.

(2) In the brake light activation determining device of (1), it is preferable that the processor is further configured to determine that the speed decrease timing and the activation timing are synchronized when the period during which a change in speed decrease of at least a predetermined level of decrease was detected, matches the period during which it was discriminated that the brake light of the vehicle ahead has been activated.

(3) In the brake light activation determining device of (1) or (2), it is preferable that the processor is further configured to newly determine whether the speed decrease timing and the activation timing are synchronized when the vehicle ahead has changed to a different vehicle.

(4) In the brake light activation determining device of any of (1) to (3), preferably the determining unit newly determines whether the speed decrease timing and the activation timing are synchronized when the environment surrounding the one's own vehicle has changed.

(5) According to another embodiment there is provided a computer-readable, non-transitory storage medium which stores a computer program for determining brake light activation. The computer program for determining brake light activation causes a processor to execute a process and the process includes detecting a decrease in the speed of a vehicle ahead which is located ahead of one's own vehicle, based on output information from a sensor that acquires information relating to the vehicle ahead, discriminating whether the brake light of the vehicle ahead is activated based on an image representing the area ahead of the one's own vehicle, and determining that the vehicle ahead is braking, when it has been discriminated that the brake light of the vehicle ahead has been activated, when the speed decrease timing at which reduction in the speed of the vehicle ahead has been detected and the activation timing at which brake light activation by the vehicle ahead was discriminated are synchronized for the vehicle ahead.

(6) According to another embodiment, the invention provides a method for determining brake light activation carried out by a brake light activation determining device. The method includes detecting decrease in the speed of a vehicle ahead which is located ahead of one's own vehicle, based on output information from a sensor that acquires information relating to the vehicle ahead, discriminating whether the brake light of the vehicle ahead is activated based on an image representing the area ahead of the one's own vehicle, and determining that the vehicle ahead is braking, when it has been discriminated that the brake light of the vehicle ahead has been activated, when the speed decrease timing at which reduction in the speed of the vehicle ahead has been detected and the activation timing at which brake light activation by the vehicle ahead was discriminated are synchronized for the vehicle ahead.

The brake light activation determining device of this disclosure can detect activation of the brake light of a vehicle ahead in a short time and can make determination with high precision.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2 is a general schematic drawing of a vehicle in which the brake light activation determining device of the embodiment is mounted.

FIG. 3 is an example of an operation flow chart for brake light activation determination processing for a brake light activation determining device according to the embodiment.

FIG. 4 is an example of an operation flow chart for start condition determination processing for a brake light activation determining device of the embodiment.

DESCRIPTION OF EMBODIMENTS

Figure 1:
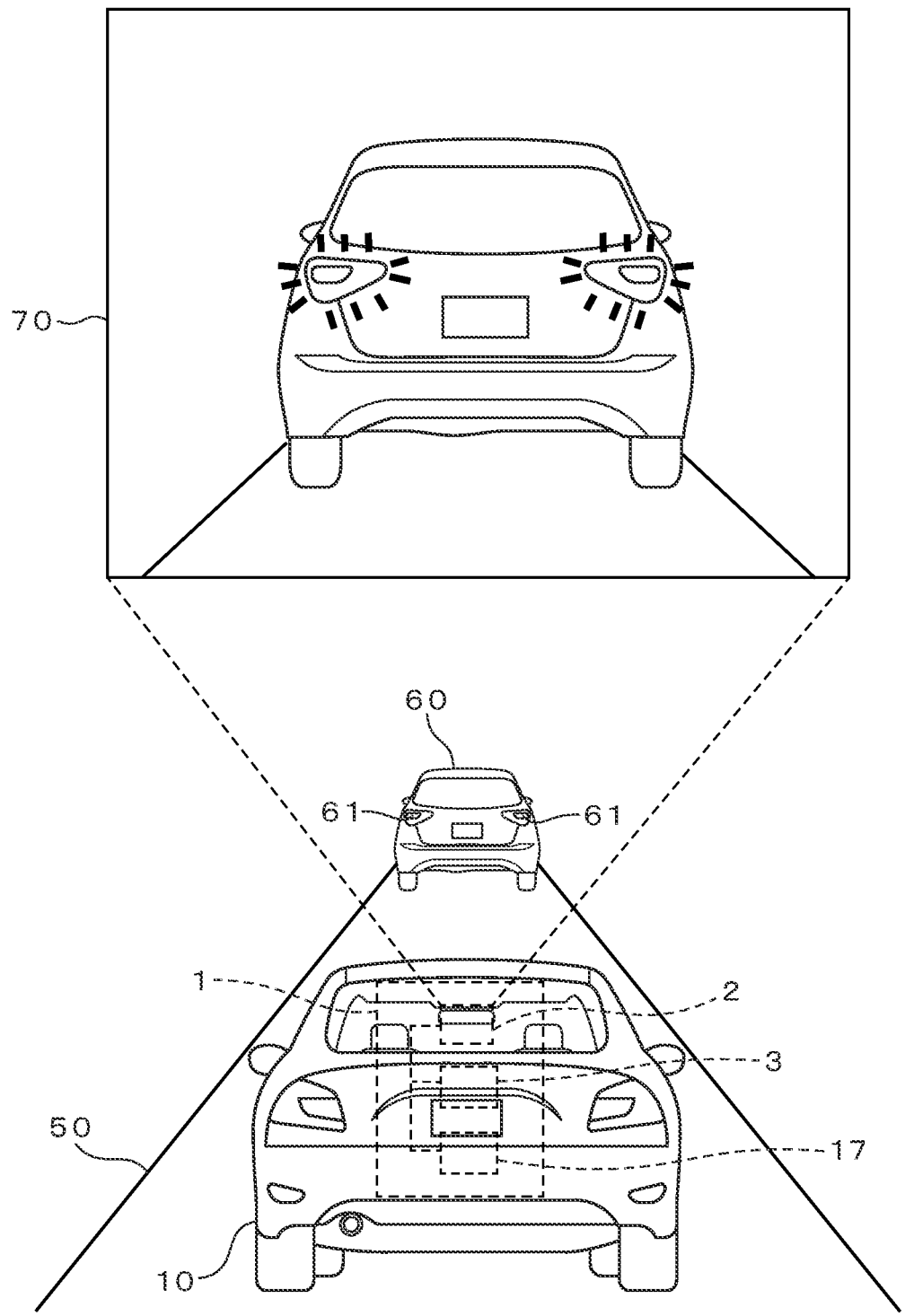
FIG. 1 is a diagram illustrating in overview the operation of a vehicle control system comprising a brake light activation determining device of the embodiment.

FIG. 1 is a diagram illustrating in overview the operation of a vehicle control system 1 comprising a brake light activation determining device 17 of the embodiment. Operation relating to brake light activation determination processing by the brake light activation determining device 17 disclosed herein will now be described in overview with reference to FIG. 1. The vehicle 10 may also be an autonomous vehicle.

The vehicle 10 is traveling on a road 50. Ahead of the vehicle 10 there is located a vehicle ahead 60 traveling on the same lane as the vehicle 10.

When the vehicle ahead 60 has decelerated, the brake light activation determining device 17 detects decrease in the speed of the vehicle ahead 60 based on reflected wave information contained in reflected waves acquired when an outgoing wave emitted from a LiDAR sensor 3 has been reflected by the vehicle ahead 60.

When the brake lights 61 have been activated by braking of the vehicle ahead 60, the brake light activation determining device 17 discriminates that the brake lights 61 of the vehicle ahead 60 have been activated, based on a camera image 70 representing the area in front of the vehicle 10 as photographed by a camera 2.

When the brake light activation determining device 17 detects decrease in the speed of the vehicle ahead 60 based on the reflected wave information, and discriminates that the brake lights 61 of the vehicle ahead 60 have been activated based on the camera image 70, the brake light activation determining device 17 then determines whether the speed decrease timing at which decrease in speed by the vehicle ahead 60 has been detected is synchronized with the activation timing at which brake light activation by the vehicle ahead 60 has been discriminated.

The fact that the speed decrease timing at which decrease in speed by the vehicle ahead 60 has been detected is synchronized with the activation timing at which brake light activation by the vehicle ahead 60 has been discriminated, means that there is a high degree of precision for discriminating that the brake lights 61 of the vehicle ahead 60 have been activated, based on the camera image 70.

Therefore when the brake light activation determining device 17 has discriminated that the brake light of a vehicle ahead 60 has been activated, where the vehicle ahead 60 is one for which the speed decrease timing at which decrease in speed by the vehicle ahead 60 has been detected is synchronized with the activation timing at which brake light activation by the vehicle ahead 60 has been discriminated, it is determined that the vehicle ahead 60 is braking. Since the brake light activation determining device 17 discriminates activation of the brake light of the vehicle ahead 60 based on the camera image 70, the brake light activation determining device 17 can more rapidly detect when deceleration of the vehicle ahead 60 is initiated.

The brake light activation determining device 17 can thus detect activation of brake lights in a shorter period of time and improve determination precision.

FIG. 2 is a general schematic drawing of a vehicle 10 in which the vehicle control system 1 is mounted. The vehicle control system 1 has a camera 2, a LiDAR sensor 3, a positioning information receiver 4, a navigation device 5, a user interface (UI) 6, a rain sensor 7, a map information storage device 11, a location estimating device 12, an object detector 13, a traveling lane planning device 14, a drive planning device 15, a vehicle control device 16 and a brake light activation determining device 17. The vehicle control system 1 may also have a radar sensor, as another distance sensor (not shown) for measurement of the distance of the vehicle 10 to surrounding objects.

The camera 2, LiDAR sensor 3, positioning information receiver 4, navigation device 5, UI 6, rain sensor 7, map information storage device 11, location estimating device 12, object detector 13, traveling lane planning device 14, drive planning device 15, vehicle control device 16 and brake light activation determining device 17 are connected in a communicable manner through an in-vehicle network 18 that conforms to controller area network standards.

The camera 2 is mounted inside the vehicle 10 and directed toward the front of the vehicle 10. The camera 2, for example, takes a camera image in which the environment of a predetermined region ahead of the vehicle 10 is shown, at a predetermined cycle. The camera image can show the road in the predetermined region ahead of the vehicle 10, and road features such as surface lane marking lines on the road. A camera image taken by the camera 2 may also include a vehicle ahead which is located in front of the vehicle 10. The camera 2 is an example of a sensor that acquires information relating to the vehicle ahead which is located in front of the vehicle 10. The camera 2 has a 2D detector composed of an array of photoelectric conversion elements with visible light sensitivity, such as a CCD or C-MOS, and an imaging optical system that forms an image of the photographed region on the 2D detector. The camera image is an example of output information from a sensor that acquires information relating to the vehicle ahead 60 which is located in front of the vehicle 10.

Each time a camera image is taken, the camera 2 outputs the camera image and the camera image photograph time at which the camera image was taken, through the in-vehicle network 18 to the location estimating device 12 and object detector 13. The camera image is also used for processing at the location estimating device 12 to estimate the location of the vehicle 10. At the object detector 13, the camera image is used for processing to detect other objects surrounding the vehicle 10.

The LiDAR sensor 3 is mounted on the outer side of the vehicle 10, for example, being directed toward the front of the vehicle 10. The LiDAR sensor 3 emits a pulsed laser toward the front of the vehicle 10, at a reflected wave information acquisition time set with a predetermined cycle, and receives a reflected wave that has been reflected from a reflector. The time required for the reflected wave to return contains information for the distance between the vehicle 10 and other objects located in the direction in which the laser has been emitted. The LiDAR sensor 3 is an example of a sensor that acquires information relating to the vehicle ahead which is located in front of the vehicle 10. The LiDAR sensor 3 outputs the reflected wave information that includes the laser emission direction and the time required for the reflected wave to return, together with the reflected wave information acquisition time at which the laser was emitted, through the in-vehicle network 18 to the object detector 13. At the object detector 13, the reflected wave information is used for processing to detect other objects surrounding the vehicle 10. The reflected wave information is an example of output information from a sensor that acquires information relating to the vehicle ahead 60 which is located in front of the vehicle 10.

The positioning information receiver 4 outputs positioning information that represents the current location of the vehicle 10. The positioning information receiver 4 may be a GNSS receiver, for example. The positioning information receiver 4 outputs positioning information and the positioning information acquisition time at which the positioning information has been acquired, to the navigation device 5 and map information storage device 11, etc., each time positioning information is acquired at a predetermined receiving cycle.

Based on the navigation map information, the destination location of the vehicle 10 input through the UI 6, and positioning information representing the current location of the vehicle 10 input from the positioning information receiver 4, the navigation device 5 creates a navigation route from the current location to the destination location of the vehicle 10. When the destination location has been newly set or the current location of the vehicle 10 has exited the navigation route, the navigation device 5 creates a new navigation route for the vehicle 10. Every time a navigation route is created, the navigation device 5 outputs the navigation route to the location estimating device 12 and the traveling lane planning device 14, etc., via the in-vehicle network 18.

The UI 6 is an example of the notification unit. The UI 6, controlled by the navigation device 5, notifies the driver of the vehicle 10 traveling information. The UI 6 also generates an operation signal in response to operation of the vehicle 10 by the driver. The traveling information of the vehicle 10 includes information relating to the current location of the vehicle and the current and future route of the vehicle, such as the navigation route. The UI 6 has a display device 6a such as a liquid crystal display or touch panel, for display of the traveling information. The UI 6 may also have an acoustic output device (not shown) to notify the driver of traveling information. The UI 6 also has a touch panel or operating button, for example, as an input device for inputting operation information from the driver to the vehicle 10. The operation information may be, for example, a destination location, transit points, vehicle speed or other control information of the vehicle 10. The UI 6 outputs the input operation information to the navigation device 5 and the vehicle control device 16, etc., via the in-vehicle network 18.

The rain sensor 7 detects raindrops. The rain sensor 7 outputs information representing whether raindrops have been detected, to the brake light activation determining device 17 via the in-vehicle network 18. The rain sensor 7 is an example of a sensor that acquires information for the environment surrounding the vehicle 10. A light reflective sensor may be used as the rain sensor 7.

The map information storage device 11 stores wide-area map information for a relatively wide area (an area of 10 $km^2$ to 30 $km^2$, for example) that includes the current location of the vehicle 10. The map information preferably has high precision map information including three-dimensional information for the road surface, information for the types and locations of structures and road features such as road lane marking lines, and the legal speed limit for the road. The map information storage device 11 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 4, the map information storage device 11 refers to the stored wide-area map information and outputs map information for a relatively narrow area including the current location represented by the positioning information (for example, an area of 100 $m^2$ to 10 $km^2$), through the in-vehicle network 18 to the location estimating device 12, object detector 13, traveling lane planning device 14, drive planning device 15 and vehicle control device 16, etc.

The location estimating device 12 estimates the location of the vehicle 10 at the camera image photograph time, based on the road features surrounding the vehicle 10 represented in the camera image taken by the camera 2. For example, the location estimating device 12 compares lane marking lines identified in the camera image with lane marking lines represented in the map information input from the map information storage device 11, and determines the estimated location and estimated declination of the vehicle 10 at the camera image photograph time. The location estimating device 12 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 12 outputs this information to the object detector 13, traveling lane planning device 14, drive planning device 15 and vehicle control device 16, etc.

The object detector 13 detects other objects in front of the vehicle 10, located within a predetermined range from the vehicle 10, as well as their types, based on the camera image taken by the camera 2. Other objects also include other vehicles traveling around the vehicle 10. The object detector 13 has a first discriminator that detects objects represented in the camera image, by inputting the image, for example. The first discriminator may use a deep neural network (DNN) that has been trained to detect objects represented in input images, for example. The object detector 13 used may also be a discriminator other than a DNN. For example, the discriminator used by the object detector 13 may be a support vector machine (SVM) that has been trained to output a confidence factor for representation of objects to be detected in the window, with the input being a feature descriptor (such as Histogram of Oriented Gradients, HOG, for example) calculated from a window set in the camera image. Alternatively, the object detector 13 may detect an object region by template matching between the image and a template in which an object to be detected is represented.

The object detector 13 also has a second discriminator that, when a vehicle ahead has been detected in a camera image, detects that the brake light of the vehicle ahead has been activated after input of an image of the region where the vehicle ahead was detected in the camera image. The second discriminator may use a deep neural network (DNN) that has been trained to detect activation of the brake light of vehicle ahead that is represented in input image. When a vehicle ahead has been detected in a camera image, the object detector 13 detects that the brake light of the vehicle ahead has been activated after input of an image of the region where the vehicle ahead was detected in the camera image, to the second discriminator. The first discriminator may be set to detect that the brake light of the vehicle ahead has been activated.

When a vehicle ahead has been detected in a camera image by the first discriminator, the object detector 13 may input an image of the region where the vehicle ahead was detected in the camera image to the second discriminator, only when it has been determined that the vehicle ahead is in a region where it is considered to be traveling in the same lane as the vehicle 10. This can avoid detecting activation of the brake light of another vehicle traveling in an adjacent lane which is adjacent to the traveling lane in which the vehicle 10 is traveling. The region in the camera image where a vehicle ahead is considered to be traveling in the same lane as the vehicle 10 is decided based on the conditions in which the camera 2 is installed.

The object detector 13 may also detect other objects in front of the vehicle 10 based on reflected wave information output by the LiDAR sensor 3. The object detector 13 can also determine the orientation of another object with respect to the vehicle 10 based on the location of the other object in the camera image, and may determine the distance between the other object and the vehicle 10, based on the orientation and on the reflected wave information output by the LiDAR sensor 3. The object detector 13 estimates the location of the other object represented in a world coordinate system based on the current location of the vehicle 10, and the distance of the other object from the vehicle 10 and its orientation, for example. The object detector 13 also tracks other objects to be detected from an updated image, by matching other objects detected in the updated camera image with objects detected in previous images, according to a tracking process based on optical flow. The object detector 13 also calculates the trajectory of another object being tracked, based on the location of the object in an image updated from a previous image, represented in the world coordinate system. The object detector 13 estimates the speed of another object with respect to the vehicle 10, based on changes in the location of the object over the course of time. The object detector 13 determines the speed of an object on the ground based on the estimated speed of the object with respect to the vehicle 10, and the speed of the vehicle 10. The object detector 13 can also estimate the acceleration of another object based on changes in the speed of the object over the course of time. In addition, the object detector 13 identifies the traveling lanes in which the other objects are traveling, based on the lane marking lines represented in the map information and the locations of the objects. The object detector 13 also determines, for example, whether another object is traveling in a traffic lane defined by two mutually adjacent lane marking lines situated on either side of the center location of the other object in the lateral direction. The object detector 13 outputs object detection information which includes information representing the types of other objects that were detected, information indicating their locations, and also information indicating their speeds, accelerations and traveling lanes, to the traveling lane planning device 14, drive planning device 15 and vehicle control device 16, etc. The detection area in which other objects can be detected by the object detector 13 is set based on the conditions and resolving power of the camera 2 and LiDAR sensor 3.

When another object is traveling on the same lane as the vehicle 10, the object detector 13 determines that it is a vehicle ahead. When a vehicle ahead has been detected, the object detector 13 tracks the vehicle ahead using vehicle identification information assigned for the vehicle ahead. The object detector 13 outputs object detection information assigned as information indicating that the other object is a vehicle ahead, information indicating whether the vehicle ahead has activated its brake light, and vehicle identification information for the vehicle ahead, to the brake light activation determining device 17. When a vehicle ahead that has previously been assigned vehicle identification information is no longer detected within a predetermined period, the object detector 13 determines that it has lost sight of the vehicle ahead. When the object detector 13 later detects a new vehicle ahead, it tracks the vehicle ahead with new vehicle identification information assigned for the new vehicle ahead.

At a traveling lane-planning creation time set in a predetermined cycle, the traveling lane planning device 14 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. For example, the traveling lane planning device 14 creates a traveling lane plan for the vehicle 10 to travel on a traffic lane other than a passing traffic lane. Each time a traveling lane plan is created, the traveling lane planning device 14 outputs the traveling lane plan to the drive planning device 15.

The traveling lane planning device 14 also determines whether a lane change is necessary within the nearest driving zone selected from the navigation route, based on the traveling lane plan, the map information, the navigation route and the current location of the vehicle 10, and generates a lane change plan in accordance with the assessment results. The lane change plan includes a lane change schedule zone in the lane in which the vehicle 10 is traveling, where it is scheduled to move to an adjacent lane. Specifically, the traveling lane planning device 14 determines whether a lane change is necessary for moving to a traffic lane toward the destination location of the vehicle 10, based on the navigation route and the current location of the vehicle 10. The traveling lane planning device 14 determines whether the vehicle 10 is approaching another road that merges ahead from the traveling road on which it is currently traveling (merge), or the vehicle 10 is exiting onto another road branching out ahead from the traveling road (branch). Since merging and branching involve movement of the vehicle from a lane of the traveling road to a lane in another road, a lane change is carried out. The traveling lane planning device 14 may further utilize surrounding environment information or vehicle status information to determine whether a lane change is necessary. The surrounding environment information includes the locations and speeds of other vehicles traveling around the vehicle 10. The vehicle status information includes the current location of the vehicle 10, and the vehicle speed, acceleration and traveling direction. The traveling lane planning device 14 also generates a lane change plan in response to a driver request. Information indicating the speed of the vehicle 10 and its acceleration is acquired using a sensor (not shown) mounted on the vehicle 10.

At a driving plan creation time set with a predetermined cycle, the drive planning device 15 carries out driving plan processing in which it creates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. The drive planning device 15 generates a driving plan to maintain a spacing of at least a predetermined distance between the vehicle 10 and other vehicles. The drive planning device 15 outputs the driving plan to the vehicle control device 16 for each driving plan generated.

The vehicle control device 16 controls each unit of the vehicle 10 based on the current location of the vehicle 10 and the vehicle speed and yaw rate, as well as on the driving plan generated by the drive planning device 15. For example, the vehicle control device 16 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 16 also outputs a control signal corresponding to a set steering amount, to an actuator (not shown) that controls the steering wheel for the vehicle 10, via the in-vehicle network 18. The vehicle control device 16 also determines the amount of fuel injection according to a set accelerator level, and outputs a control signal corresponding to the amount of fuel injection to a drive unit (not shown) of the engine, etc., of the vehicle 10, via the in-vehicle network 18. Alternatively, the vehicle control device 16 may output a control signal corresponding to a set brake level to the brake (not shown) of the vehicle 10, via the in-vehicle network 18.

The brake light activation determining device 17 carries out speed detection processing, brake light activation discrimination processing, environment detection processing, synchronization determination processing and braking determination processing. For this purpose, the brake light activation determining device 17 has a communication interface (IF) 21, a memory 22 and a processor 23. The communication interface 21, memory 22 and processor 23 are connected via signal wires 24. The communication interface 21 has an interface circuit to connect the brake light activation determining device 17 with the in-vehicle network 18.

All or some of the functions of the brake light activation determining device 17 are functional modules driven by a computer program operating on the processor 23, for example. The processor 23 has a speed detector 230, a brake light activation discriminator 231, an environment detector 232 and a braking determining unit 233. The braking determining unit 233 is an example of a determining unit. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit. The memory 22 is an example of a memory unit, and it has a volatile semiconductor memory and a non-volatile semiconductor memory, for example. The memory 22 stores an application computer program and various data to be used for information processing carried out by the processor 23 of each device. Other details regarding operation of the brake light activation determining device 17 are described below.

For FIG. 2, the map information storage device 11, location estimating device 12, object detector 13, traveling lane planning device 14, drive planning device 15, vehicle control device 16 and brake light activation determining device 17, were explained as separate devices, but all or some of them may be constructed in a single device.

FIG. 3 is an example of an operation flow chart for brake light activation determination processing for the brake light activation determining device 17 according to the embodiment. The brake light activation determination processing by the brake light activation determining device 17 will now be explained with reference to FIG. 3. The brake light activation determining device 17 carries out brake light activation determination processing according to the operation flow chart shown in FIG. 3, at a brake light activation determining time having a predetermined cycle.

First, the braking determining unit 233 determines whether start conditions for determining synchronization are satisfied (step S101). Determining synchronization is determining whether the speed decrease timing at which reduction in the speed of the vehicle ahead has been detected and the activation timing at which brake light activation by the vehicle ahead has been discriminated are synchronized. This start condition determination processing is described in detail below.

When start conditions are not satisfied (step S101—No), the series of processing steps is complete. When the start conditions are satisfied (step S101—Yes), on the other hand, the braking determining unit 233 determines whether the speed decrease timing at which reduction in the speed of the vehicle ahead has been detected and the activation timing at which brake light activation by the vehicle ahead has been discriminated are synchronized (step S102). Specifically, the braking determining unit 233 determines that the speed decrease timing and the activation timing are synchronized when the period during which a change in speed decrease of at least a predetermined level of decrease was detected, matches the period during which it was discriminated that the brake light of the vehicle ahead has been activated.

The predetermined reference decrease in speed may be 0.686466 m/s, for example. A speed decrease of 0.686466 m/s continuing for 1 second produces a deceleration of 0.07 G in the vehicle ahead.

The time required to detect decrease in the speed of the vehicle ahead is expected to be longer than the time required to discriminate brake light activation of the vehicle ahead. Therefore, the start point for the period during which a change in speed decrease of at least a predetermined level of decrease is detected is later than the start point for the period during which it is discriminated that the brake light of the vehicle ahead has been activated, and the end point for the period during which a change in speed decrease of at least a predetermined level of decrease is detected is later than the end point for the period during which it is discriminated that the brake light of the vehicle ahead has been activated. When the difference between the start point for the period during which a change in speed decrease of at least a predetermined level of decrease is detected and the start point for the period during which it is discriminated that the brake light of the vehicle ahead has been activated is within a predetermined acceptable time, and the difference between the end point for the period during which a change in speed decrease of at least a predetermined level of decrease is detected and the end point for the period during which it is discriminated that the brake light of the vehicle ahead has been activated is within a predetermined acceptable time, the braking determining unit 233 determines that the two periods match. The acceptable time may be 0.01 seconds to 0.5 seconds, for example. The conditions based on which the braking determining unit 233 determines that the speed decrease timing and the activation timing are synchronized are not limited to those described above.

When it has been determined that the speed decrease timing and the activation timing are synchronized (step S102—Yes), the braking determining unit 233 determines that the vehicle ahead is braking, when the brake light activation discriminator 231 has discriminated that the brake light of the vehicle ahead has been activated, and the series of processing steps is complete (step S103). Once such determination has been made, the braking determining unit 233 determines thereafter that the vehicle ahead is braking when it has been discriminated by the brake light activation discriminator 231 that the brake light of the vehicle ahead has been activated while the vehicle 10 is traveling.

When it has been determined that the speed decrease timing and the activation timing are not synchronized (step S102—No), on the other hand, the braking determining unit 233 determines that the vehicle ahead is braking when the speed detector 230 detects a decrease in speed of the vehicle ahead by at least a predetermined level of reduction, and the series of processing steps is complete (step S104). Once such determination has been made, the braking determining unit 233 determines thereafter that the vehicle ahead is braking when the speed detector 230 has detected a decrease in speed of the vehicle ahead by at least the predetermined level of reduction while the vehicle 10 is traveling.

FIG. 4 is an example of an operation flow chart for start condition determination processing for the brake light activation determining device 17 of the embodiment. The start condition determination processing by the brake light activation determining device 17 will now be explained with reference to FIG. 4. The brake light activation determining device 17 carries out vehicle control processing according to the operation flow chart shown in FIG. 4, at a start condition determining time having a predetermined cycle. The cycle for the start condition determining time is preferably equal to or shorter than the cycle for the light activation determining time described above.

First, the speed detector 230 determines whether a vehicle ahead has been detected, based on the object detection information for vehicles ahead which has been input from the object detector 13 (step S201).

When a vehicle ahead has been detected (step S201—Yes), the speed detector 230 determines whether a decrease in the speed of the vehicle ahead of at least a predetermined reference decrease in speed has been detected, based on the object detection information for the vehicle ahead which has been input from the object detector 13 (step S202). The predetermined reference decrease in speed may be 0.686466 m/s, as mentioned above.

When a decrease in the speed of the vehicle ahead of at least a predetermined reference decrease in speed has been detected (step S202—Yes), the brake light activation discriminator 231 determines whether the brake light of the vehicle ahead has been activated, based on information indicating whether the brake light of the vehicle ahead has been activated that has been input from the object detector 13 (step S203).

When it has been determined that the brake light of the vehicle ahead has been activated (step S203—Yes), the braking determining unit 233 determines that the start conditions for determining synchronization are satisfied, and the series of processing steps is complete (step S206).

When it has not been determined that the brake light of the vehicle ahead has been activated (step S203— No) or when a decrease in the speed of the vehicle ahead of at least a predetermined reference decrease in speed has not been detected (step S202—No), the braking determining unit 233 determines whether the vehicle ahead has changed to a different vehicle, based on the vehicle identification information for the vehicle ahead that has been input from the object detector 13 (step S204). When the vehicle identification information for the vehicle ahead that has been input from the object detector 13 differs from the previously input vehicle identification information, the braking determining unit 233 determines that the vehicle ahead has changed to a different vehicle. When the vehicle identification information for the vehicle ahead that has been input from the object detector 13 is the same as the previously input vehicle identification information, on the other hand, the braking determining unit 233 determines that the vehicle ahead has not changed to a different vehicle.

When the vehicle ahead has changed to a different vehicle (step S204—Yes), the braking determining unit 233 determines that the start conditions for determining synchronization have been satisfied, and the series of processing steps is complete (step S206). When the vehicle ahead is different, it is possible that the brake light activation state in the image has changed as well, and this can potentially affect discrimination of whether the brake light of the vehicle ahead is activated. In this brake light activation determining device 17, therefore, the braking determining unit 233 newly determines whether the speed decrease timing and the activation timing are synchronized when the vehicle ahead has changed to a different vehicle.

When the vehicle ahead has not changed to a different vehicle (step S204—No), the environment detector 232 determines whether the environment surrounding the vehicle 10 has changed (step S204). The environment detector 232 determines that the environment surrounding the vehicle 10 has changed when there has been a change from a state without detection of raindrops to a state with detection of raindrops, based on present and past information indicating whether raindrops have been detected by the rain sensor 7. The environment detector 232 also determines that the environment surrounding the vehicle 10 has changed when there has been a change from a state with detection of raindrops to a state without detection of raindrops, based on present and past information indicating whether raindrops have been detected by the rain sensor 7. The environment detector 232 may also determine that the environment surrounding the vehicle 10 has changed when the brightness of the vehicle surroundings has changed. In this case, the environment detector 232 may determine that the brightness of the vehicle surroundings has changed based on present and past output information from a sensor that detects the brightness of the surroundings of the vehicle 10. The environment detector 232 may also determine that the environment surrounding the vehicle 10 has changed when the vehicle 10 has entered a tunnel or the vehicle 10 has left a tunnel, based on map information.

When the environment surrounding the vehicle 10 has changed (step S205—Yes), the braking determining unit 233 determines that the start conditions for determining synchronization have been satisfied, and the series of processing steps is complete (step S206). Since the brightness of the surroundings differs when rain is falling or not falling, the effects of rain can influence discrimination of whether the brake light of the vehicle ahead is activated. In this brake light activation determining device 17, therefore, the braking determining unit 233 newly determines whether the speed decrease timing and the activation timing are synchronized when the environment surrounding the vehicle 10 has changed.

When the environment surrounding the vehicle 10 has not changed (step S205—No), or when a vehicle ahead has not been detected (step S201—No), the braking determining unit 233 determines that the start conditions for determining synchronization have not been satisfied, and the series of processing steps is complete (step S207).

Operation in which the vehicle 10 is traveling on a road will now be explained with reference to FIG. 1.

The vehicle 10 is traveling on a road 50. When the brake light activation determining device 17 has discriminated that the brake lights of a vehicle ahead 60 have been activated, where the vehicle ahead 60 is one for which the speed decrease timing at which decrease in speed by the vehicle ahead 60 has been detected is synchronized with the activation timing at which brake light activation by the vehicle ahead 60 has been discriminated, it is determined that the vehicle ahead 60 is braking. When it has been determined that the vehicle ahead 60 is braking, for example, the vehicle control device 16 controls the vehicle 10 so that the vehicle 10 stops accelerating, when the vehicle 10 was accelerating. The drive planning device 15 generates a driving plan for the vehicle 10 to maintain a spacing of at least a predetermined distance between the vehicle 10 and the vehicle ahead 60.

On the other hand, when the brake light activation determining device 17 has detected a decrease in speed of the vehicle ahead by at least a predetermined level of reduction, where the vehicle ahead 60 is one for which the speed decrease timing at which decrease in speed by the vehicle ahead 60 has been detected is not synchronized with the activation timing at which brake light activation by the vehicle ahead 60 has been discriminated, it is determined that the vehicle ahead is braking.

When the speed decrease timing at which decrease in speed by the vehicle ahead 60 has been detected is not synchronized with the activation timing at which brake light activation by the vehicle ahead 60 has been discriminated, this means that there is a low degree of precision for discriminating that the brake lights 61 of the vehicle ahead 60 have been activated, based on the camera image 70. The brake light activation determining device 17 therefore determines that the vehicle ahead is braking based on a more precise detection method.

The brake light activation determining device 17 detects decrease in the speed of the vehicle ahead 60 at each brake light activation determining time at the predetermined cycle, and when it has discriminated that the brake lights 61 of the vehicle ahead 60 are activated, it determines whether the speed decrease timing at which decrease in speed by the vehicle ahead 60 has been detected is synchronized with the activation timing at which brake light activation by the vehicle ahead 60 has been discriminated. The brake light activation determining device 17 can thus improve determining precision since it incorporates effects of changes in the environment that are not detected by the environment detector 232, into the process of determining brake light activation.

When it has been determined that the vehicle ahead 60 has changed to a different vehicle, the brake light activation determining device 17 newly determines whether the speed decrease timing at which decrease in speed by the vehicle ahead 60 has been detected and the activation timing at which brake light activation by the vehicle ahead 60 has been discriminated are synchronized. This allows accurate detection of braking of vehicles ahead using images, even when the vehicles have changed.

When it has been determined that the environment surrounding the vehicle 10 has changed, the brake light activation determining device 17 newly determines whether the speed decrease timing at which decrease in speed by the vehicle ahead 60 has been detected and the activation timing at which brake light activation by the vehicle ahead 60 has been discriminated are synchronized. This allows accurate detection of braking of the vehicle ahead 60 using images, even when the environment surrounding the vehicle 10 has changed.

The brake light activation determining device of this embodiment can detect activation of the brake light of a vehicle ahead in a short time and can make determination with high precision.

The brake light activation determining device, the program for determining brake light activation and the brake light activation determining method according to the embodiments described in the present disclosure may incorporate appropriate modifications that still fall within the gist of the disclosure. Moreover, the technical scope of the disclosure is not limited to these embodiments, and includes the invention and its equivalents as laid out in the Claims.

For example, when the braking determining unit has carried out brake light activation determination processing a predetermined reference number of times without the vehicle ahead changing to a different vehicle and without change in the surrounding environment of the vehicle, the discriminating reference value for detecting that the brake light of the vehicle ahead has been activated by the second discriminator of the object detector may be changed to a lower value than previously. This will allow braking by the vehicle ahead to be detected at an earlier time point.

The invention claimed is:

1. A vehicle control system comprising:
a processor configured to:
detect decrease in a speed of a vehicle ahead which is located ahead of one's own vehicle, based on output information from a sensor that acquires information relating to the vehicle ahead;
discriminate whether a brake light of the vehicle ahead is activated based on an image representing an area ahead of the one's own vehicle;
determine whether a speed decrease timing at which reduction in the speed of the vehicle ahead has been detected and an activation timing at which brake light activation by the vehicle ahead was discriminated are synchronized for the vehicle ahead;
determine, when it has been discriminated that the brake light of the vehicle ahead has been activated, that the vehicle ahead is braking based on a determination that the speed decrease timing at which reduction in the speed of the vehicle ahead has been detected and the activation timing at which brake light activation by the vehicle ahead was discriminated are synchronized for the vehicle ahead; and
generate a driving plan for the one's own vehicle to maintain a spacing of at least a predetermined distance between the one's own vehicle and the vehicle ahead based on the determination that the vehicle ahead is braking; and a controller configured to control the one's own vehicle to stop accelerating and maintain the spacing of at least the predetermined distance between the one's own vehicle and the vehicle ahead according to the driving plan.

2. The vehicle control system according to claim 1, wherein the processor is further configured to determine that the speed decrease timing and the activation timing are synchronized when the period during which a change in speed decrease of at least a predetermined level of decrease was detected, matches the period during which it was discriminated that the brake light of the vehicle ahead has been activated.

3. The vehicle control system according to claim 1, wherein the processor is further configured to newly determine whether the speed decrease timing and the activation timing are synchronized when the vehicle ahead has changed to a different vehicle.

4. The vehicle control system according to claim 1, wherein the processor is further configured to newly determine whether the speed decrease timing and the activation timing are synchronized when an environment surrounding the one's own vehicle has changed.

5. A computer-readable, non-transitory storage medium storing a computer program for determining brake light activation in a vehicle control system, which causes a processor to execute a process, the process comprising:
   detecting decrease in a speed of a vehicle ahead which is located ahead of one's own vehicle, based on output information from a sensor that acquires information relating to the vehicle ahead;
   discriminating whether a brake light of the vehicle ahead is activated based on an image representing an area ahead of the one's own vehicle;
   determining whether a speed decrease timing at which reduction in the speed of the vehicle ahead has been detected and an activation timing at which brake light activation by the vehicle ahead was discriminated are synchronized for the vehicle ahead
   determining, when it has been discriminated that the brake light of the vehicle ahead has been activated, that the vehicle ahead is braking based on a determination that the speed decrease timing at which reduction in the speed of the vehicle ahead has been detected and the activation timing at which brake light activation by the vehicle ahead was discriminated are synchronized for the vehicle ahead;
   generating a driving plan for the one's own vehicle to maintain a spacing of at least a predetermined distance between the one's own vehicle and the vehicle ahead based on the determination that the vehicle ahead is braking; and
   controlling the one's own vehicle to stop accelerating and maintain the spacing of at least the predetermined distance between the one's own vehicle and the vehicle ahead according to the driving plan.

6. A method for determining brake light activation carried out by a vehicle control system, the method comprising:
   detecting decrease in a speed of a vehicle ahead which is located ahead of one's own vehicle, based on output information from a sensor that acquires information relating to the vehicle ahead;
   discriminating whether a brake light of the vehicle ahead is activated based on an image representing an area ahead of the one's own vehicle;
   determining whether a speed decrease timing at which reduction in the speed of the vehicle ahead has been detected and an activation timing at which brake light activation by the vehicle ahead was discriminated are synchronized for the vehicle ahead
   determining, when it has been discriminated that the brake light of the vehicle ahead has been activated, that the vehicle ahead is braking based on a determination that the speed decrease timing at which reduction in the speed of the vehicle ahead has been detected and the activation timing at which brake light activation by the vehicle ahead was discriminated are synchronized for the vehicle ahead;
   generating a driving plan for the one's own vehicle to maintain a spacing of at least a predetermined distance between the one's own vehicle and the vehicle ahead based on the determination that the vehicle ahead is braking; and
   controlling the one's own vehicle to stop accelerating and maintain the spacing of at least the predetermined distance between the one's own vehicle and the vehicle ahead according to the driving plan.

* * * * *